United States Patent
Namburu et al.

(10) Patent No.: US 11,461,090 B2
(45) Date of Patent: Oct. 4, 2022

(54) ELEMENT DETECTION

(71) Applicant: Whatfix Private Limited, Bangalore (IN)

(72) Inventors: Maruthi Priya Kanyaka Vara Kumar Namburu, Bengalaru (IN); Aashish Jain, Bengalaru (IN); Animesh Agarwal, Bengalaru (IN)

(73) Assignee: Whatfix Private Limited, Bangalore (IN)

( * ) Notice: Subject to any disclaimer, the term of this patent is extended or adjusted under 35 U.S.C. 154(b) by 0 days.

(21) Appl. No.: 16/914,227

(22) Filed: Jun. 26, 2020

(65) Prior Publication Data

US 2021/0405998 A1    Dec. 30, 2021

(51) Int. Cl.
G06F 8/70       (2018.01)
G06F 11/34      (2006.01)

(52) U.S. Cl.
CPC ............ *G06F 8/70* (2013.01); *G06F 11/3495* (2013.01)

(58) Field of Classification Search
CPC ................................ G06F 8/70; G06F 11/3495
See application file for complete search history.

(56) References Cited

U.S. PATENT DOCUMENTS

| | | |
|---|---|---|
| 7,203,620 B2 | 4/2007 | Li |
| 7,415,675 B2 | 8/2008 | Habon et al. |
| 7,533,369 B2 | 5/2009 | Sundararajan et al. |
| 7,849,405 B1 | 12/2010 | Coletta et al. |
| 7,861,178 B2 | 12/2010 | Lui et al. |
| 8,151,202 B1 | 4/2012 | Cronin et al. |
| 8,707,177 B1 | 4/2014 | Parle et al. |
| 8,850,315 B1 | 9/2014 | Rogers et al. |

(Continued)

FOREIGN PATENT DOCUMENTS

| | | |
|---|---|---|
| WO | WO02/29759 A2 | 4/2002 |
| WO | WO2010/141748 A1 | 12/2010 |

OTHER PUBLICATIONS

MDN Web Docs; CSS selectors; 9 pages; retrieved from the interent (https://developer.mozilla.org/en-US/docs/Web/CSS/CSS_Selectors) on Aug. 6, 2020.

(Continued)

*Primary Examiner* — Thuy Dao
*Assistant Examiner* — Stephen D Berman
(74) *Attorney, Agent, or Firm* — Shay Glenn LLP

(57) ABSTRACT

Provided herein are systems and methods for providing digital guidance in an underlying computer application. In one exemplary implementation, a method includes setting a rule or rules, in a computing device, in advance of digital guidance content creation, for detecting, upon later playback of the content, page elements of the underlying computer application that are associated with the content. The exemplary method further includes recording, in the computing device, steps of the digital guidance content as the steps are created by a content author, and automatically applying, in the computing device, the previously set rule or rules for detecting page elements, and thereby assigning strong attributes to the page elements. The method further includes saving, in the computing device, the content steps along with the strong attributes of the page elements associated with the content steps.

14 Claims, 14 Drawing Sheets

(56) References Cited

U.S. PATENT DOCUMENTS

| | | | |
|---|---|---|---|
| 9,063,757 | B2 | 6/2015 | Horton et al. |
| 9,367,199 | B2 | 6/2016 | Klemenz et al. |
| 9,514,437 | B2 | 12/2016 | Becker et al. |
| 9,582,132 | B1 | 2/2017 | Adelman et al. |
| 9,727,348 | B2 | 8/2017 | Chen et al. |
| 10,489,041 | B1 * | 11/2019 | Edwards .................. G06F 8/38 |
| 10,585,686 | B2 | 3/2020 | Saurabh |
| 10,802,846 | B2 | 10/2020 | Rider et al. |
| 2001/0017622 | A1 | 8/2001 | Patel et al. |
| 2005/0147054 | A1 | 7/2005 | Loo et al. |
| 2006/0036991 | A1 | 2/2006 | Biazetti et al. |
| 2006/0085750 | A1 | 4/2006 | Easton et al. |
| 2006/0117315 | A1 | 6/2006 | Bussert et al. |
| 2006/0277468 | A1 | 12/2006 | Sapir |
| 2007/0168864 | A1 | 7/2007 | Yamamoto et al. |
| 2008/0301558 | A1 | 12/2008 | Najafi et al. |
| 2010/0180185 | A1 | 7/2010 | O'Hanlon |
| 2010/0205529 | A1 | 8/2010 | Butin et al. |
| 2010/0205530 | A1 | 8/2010 | Butin et al. |
| 2011/0010612 | A1 | 1/2011 | Thorpe et al. |
| 2011/0035486 | A1 | 2/2011 | Seolas et al. |
| 2011/0307818 | A1 | 12/2011 | Eby et al. |
| 2013/0055201 | A1 | 2/2013 | No et al. |
| 2013/0097497 | A1 | 4/2013 | Matejka et al. |
| 2013/0129316 | A1 | 5/2013 | Dontcheva et al. |
| 2013/0326406 | A1 | 12/2013 | Reiley et al. |
| 2014/0316363 | A1 | 10/2014 | You et al. |
| 2014/0344683 | A1 | 11/2014 | Urunga et al. |
| 2015/0202529 | A1 | 7/2015 | Paradise et al. |
| 2015/0220312 | A1 * | 8/2015 | Jemiolo ............. G09B 19/0053 715/234 |
| 2015/0242304 | A1 | 8/2015 | Akbulut et al. |
| 2015/0254713 | A1 | 9/2015 | Brewer et al. |
| 2016/0004628 | A1 | 1/2016 | Gugri |
| 2016/0162167 | A1 | 6/2016 | Shabazz et al. |
| 2016/0246467 | A1 * | 8/2016 | Jemiolo ............. G06Q 10/0633 |
| 2016/0246615 | A1 * | 8/2016 | Jemiolo ............. G06F 16/7837 |
| 2016/0247534 | A1 | 8/2016 | Pan et al. |
| 2016/0350137 | A1 | 12/2016 | Kihara |
| 2016/0351189 | A1 | 12/2016 | Miller et al. |
| 2017/0052824 | A1 | 2/2017 | Sharma et al. |
| 2017/0134828 | A1 | 5/2017 | Krishnamurthy et al. |
| 2017/0139656 | A1 | 5/2017 | Sterling et al. |
| 2017/0177385 | A1 | 6/2017 | Fung et al. |
| 2017/0337122 | A1 | 11/2017 | Bolajwar et al. |
| 2018/0121047 | A1 * | 5/2018 | Goel ..................... G06F 3/0485 |
| 2018/0143842 | A1 * | 5/2018 | Weiss .................. G09G 5/377 |
| 2019/0065512 | A1 * | 2/2019 | Pestana ............. G06Q 30/0201 |
| 2019/0066731 | A1 | 2/2019 | Jarrell |
| 2019/0318764 | A1 | 10/2019 | Ishida et al. |
| 2019/0370559 | A1 | 12/2019 | Carter et al. |
| 2020/0021872 | A1 | 1/2020 | Venkatraman et al. |
| 2020/0035113 | A1 | 1/2020 | Bruce et al. |
| 2020/0225927 | A1 | 7/2020 | Pachpande et al. |
| 2021/0042134 | A1 * | 2/2021 | Elango ............... G06F 11/3438 |
| 2021/0158438 | A1 | 5/2021 | Greenberg et al. |

OTHER PUBLICATIONS

Interactions Foundation; Help! I need some help! Not just any help hel p in mobile applications; 10 pages; retreived from the internet (http://www.interaction-design.org/literature/article/help-i-need-some-help-not-just-any-help-help-in-mobile-applications) on Aug. 6, 2020.

Userlane; 100 percent proficient with any software without it training; 13 pages; retrieved from the internet (https://blog.userlane.com/navigation-system-software/) on Aug. 6, 2020.

Yeo: Here's how this company is tackling the challenges of enterprise tech adoption; 6 pages; retrieved from the internet (https://www.techinasia.com/heres-company-tackling-challengess-enterprise-tech-adoption) on Aug. 6, 2020.

Namburu et al.; U.S. Appl. No. 16/914,219 entitled "System and method for automatic segmentation of digital guidance content," filed Jun. 26, 2020.

Namburu et al., U.S. Appl. No. 17/234,743 entitled "System and method for automatic testing of digital guidance content," filed Apr. 19, 2021.

Sanghai et al.; U.S. Appl. No. 17/643,683 entitled "System and method for personalizing digitai guidance content," filed Dec. 10, 2021.

* cited by examiner

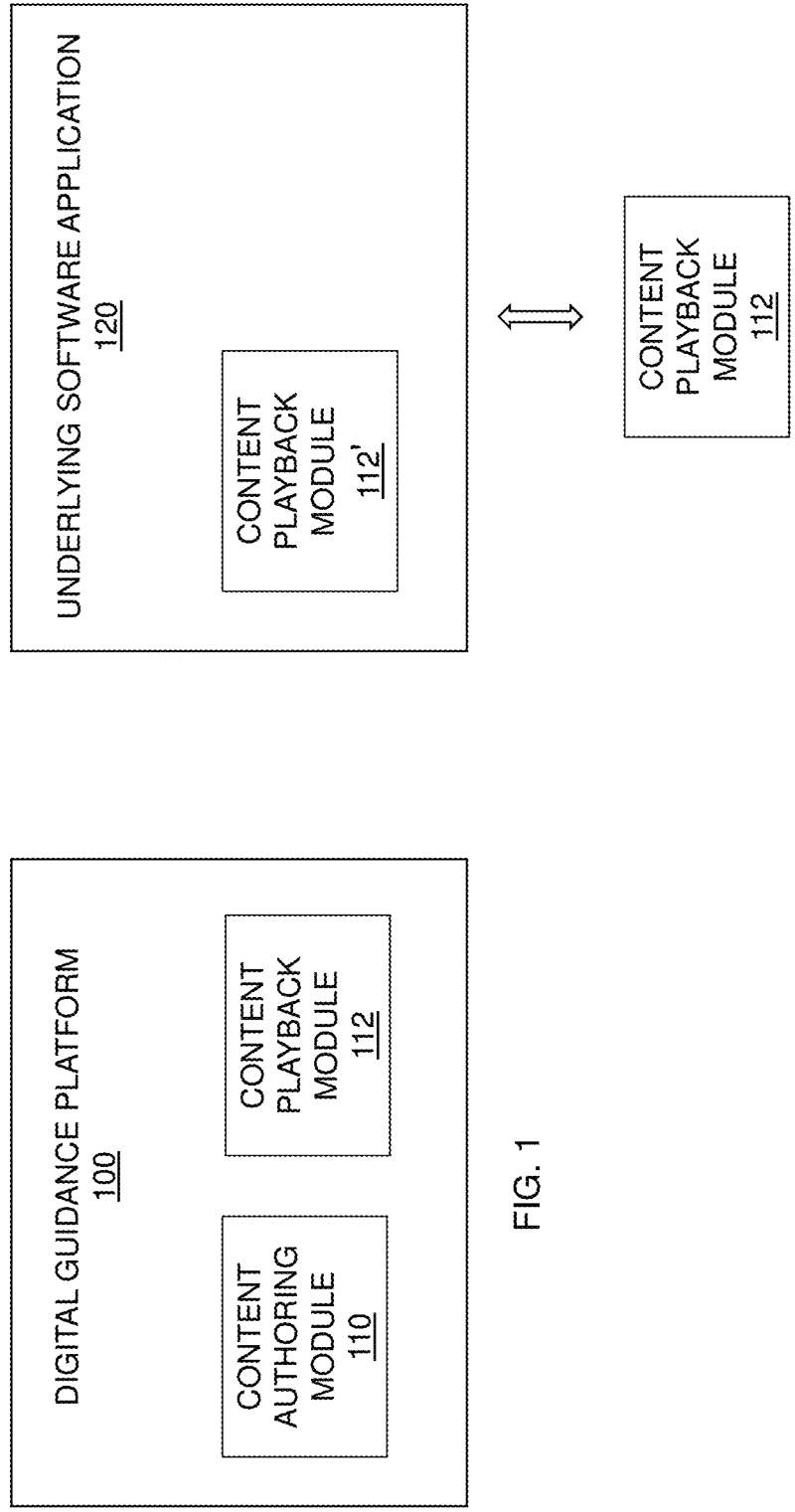

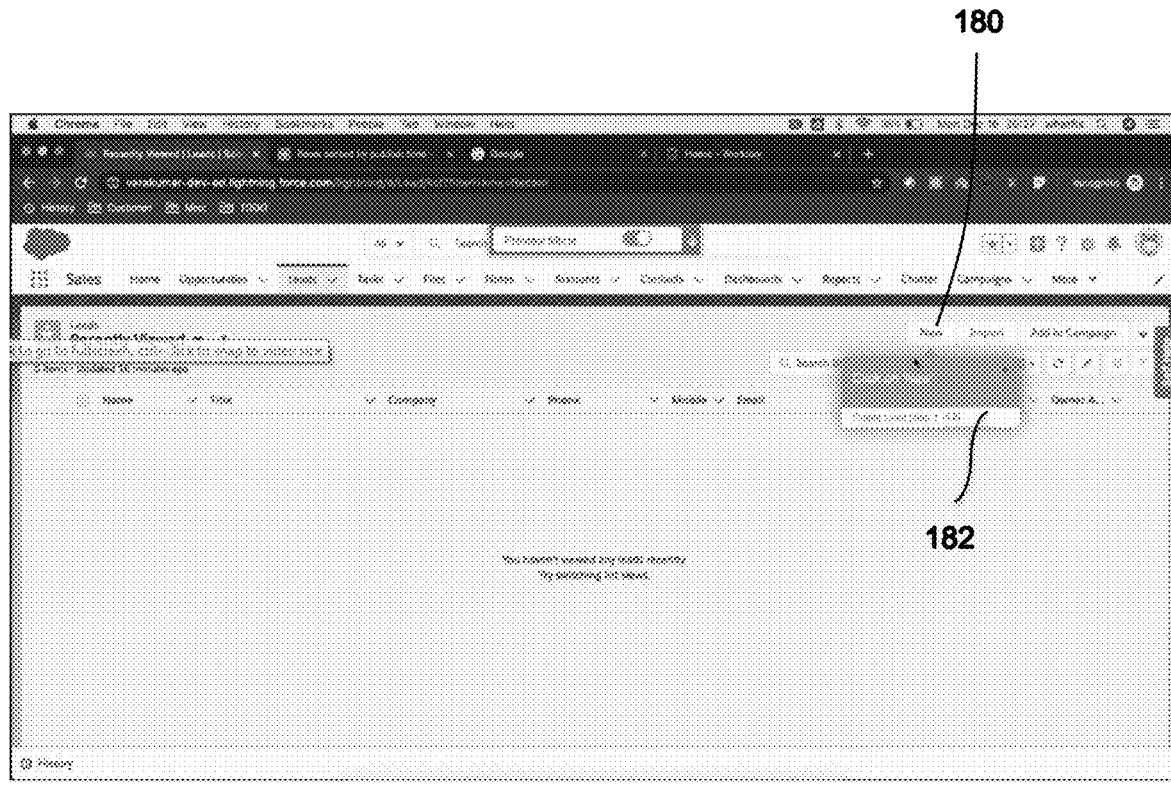

FIG. 6

```
> <div id="p-logo" role="banner"></div>
> <div class="portal" role="navigation" id="p-navigation" aria-labelledby="p-navigation-label"></div>
> <div class="portal" role="navigation" id="p-interaction" aria-labelledby="p-interaction-label"></div>
> <div class="portal" role="navigation" id="p-tb" aria-labelledby="p-tb-label"></div>
> <div class="portal" role="navigation" id="p-wikibase-otherprojects" aria-labelledby="p-wikibase-otherprojects-label"></div>
> <div class="portal" role="navigation" id="p-coll-print_export" aria-labelledby="p-coll-print_export-label"></div>
> <div class="portal" role="navigation" id="p-lang" aria-labelledby="p-lang-label"></div>
```

FIG. 7

| Key | Value |
|---|---|
| class | portal |
| role | navigation |
| id | p-navigation |

ELEMENT DETECTION

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

There are many ways for end users to learn how to use a particular software application. Increasingly, many methods take the form of digital guidance, such as a Help Section built into the software application or links to online help content. Examples of online help or learning content include knowledge bases, answers to Frequently Asked Questions (FAQs), tutorials, videos, PDF documents, etc. "Walk-throughs" may be provided in either scenario, wherein the user is walked through a particular task or process step by step in the actual software application.

All of the digital guidance content may be provided to a user in one place, organized with a table of contents and or an index, and it may be searchable using keywords. Still, it may be overwhelming to a user to be provided with so much content at once. It is desirable to only provide a limited amount of digital guidance content to a user at any one time, focused on what they may currently need help with and not showing them content that is not currently relevant to what they are doing. Accordingly, a limited number of hyperlinks or other pathways to relevant content may be provided in various sections or segments of the software, and these links may change depending on the task being performed by the end user and or their location in the software application.

Creating the above-mentioned links can be a very time consuming and error prone process for a creator/editor of the digital guidance content, particularly when the amount of content becomes large. The process of manually filtering or mapping the digital guidance content to various locations in the application may be fine for small software applications, but it is not scalable to large applications and or large amounts of guidance content. This problem is exacerbated when new content is added to the guidance and or new pages or locations are added to the underlying software application.

Accordingly, what is needed and is not provided by the prior art are improved systems and methods for delivering contextual help to a user of an underlying software application, while reducing the burden being placed on the creators of the digital guidance content. The innovations described herein solve these unmet needs and provide additional advantages.

SUMMARY OF THE DISCLOSURE

According to aspects of the present disclosure, an exemplary method of providing digital guidance in an underlying computer application includes the step of setting a rule or rules. The rule or rules are set in a computing device, in advance of digital guidance content creation, for detecting, upon later playback of the content, page elements of the underlying computer application that are associated with the content. The method also includes recording, in the computing device, steps of the digital guidance content as the steps are created by a content author. The method further includes automatically applying, in the computing device, the previously set rule or rules for detecting page elements, and thereby assigning strong attributes to the page elements. The exemplary method further includes saving, in the computing device, the content steps along with the strong attributes of the page elements associated with the content steps.

In some embodiments of the exemplary method, the rule or rules for detecting page elements associated with the content are preset within a content authoring module of a digital guidance platform. In some embodiments, the rule or rules for detecting page elements associated with the content are set by the content author. In some embodiments, the rule or rules for detecting page elements associated with the content are initially preset as defaults within a content authoring module of a digital guidance platform and are subsequently modified by the content author.

In some embodiments, the rule setting step, the recording step, the automatic rule applying step and the saving step are performed by a content authoring module of a digital guidance platform. The method may further include playing back the digital guidance content. In some embodiments, attributes of one or more of the page elements are changed between a time the recording step is performed and a time the playing back step is performed. The playing back step may be performed by a content playback module of a digital guidance platform, and the content playback module may search for the strong attributes assigned to the page elements when the digital guidance content was created in order to properly detect the one or more changed page elements as if they had not been changed. In some embodiments, the content author is not required to make any changes to the digital guidance content after the one or more page elements are changed. In some embodiments, the content playback module finds multiple page elements when searching for the strong attributes and then employs a finder algorithm that considers all possible page elements and finds the best match by considering different attributes.

According to aspects of the present disclosure, an exemplary non-transitory computing device readable medium having instructions stored thereon for providing digital guidance in an underlying computer application is disclosed. The instructions of the exemplary medium are configured to be executable by a processor to cause a computing device to set a rule or rules, in a computing device, in advance of digital guidance content creation. The rule or rules are configured for detecting, upon later playback of the content, page elements of the underlying computer application that are associated with the content. The instructions are also configured to record, in the computing device, steps of the digital guidance content as the steps are created by a content author. The instructions are further configured to automatically apply, in the computing device, the previously set rule or rules for detecting page elements, and thereby assign strong attributes to the page elements. The instructions are further configured to save, in the computing device, the content steps along with the strong attributes of the page elements associated with the content steps.

In some embodiments of the exemplary medium, the instructions are further configured to provide the rule or rules for detecting page elements associated with the content in a preset manner within a content authoring module of a digital guidance platform. In some embodiments, the instructions are further configured to allow the content author to set the rule or rules for detecting page elements associated with the content. In some embodiments, the instructions are further configured to provide the rule or rules for detecting page elements associated with the content initially in a preset manner as defaults within a content authoring module of a digital guidance platform and subsequently allow the rule or rules to be modified by the content author.

In some embodiments, the instructions are further configured to perform the rule setting step, the recording step, the automatic rule applying step and the saving step with a content authoring module of a digital guidance platform. The instructions may be further configured to play back the digital guidance content. In some embodiments, the instructions are further configured to locate the page elements during the play back of the digital guidance content regardless of whether attributes of one or more of the page elements have been changed between a time the recording step is performed and a time the playing back step is performed. The instructions may be further configured to have the playing back step performed by a content playback module of a digital guidance platform, and the content playback module may search for the strong attributes assigned to the page elements when the digital guidance content was created in order to properly detect the one or more changed page elements as if they had not been changed. In some embodiments, the instructions are further configured to locate the page elements during the play back of the digital guidance content regardless of whether the content author makes any changes to the digital guidance content after the one or more page elements are changed. The instructions may be further configured to employ a finder algorithm that considers all possible page elements and finds the best match by considering different attributes whenever the content playback module finds multiple page elements when searching for the strong attributes.

BRIEF DESCRIPTION OF THE DRAWINGS

The novel features of the disclosure are set forth with particularity in the claims that follow. A better understanding of the features and advantages of the present disclosure will be obtained by reference to the following detailed description that sets forth illustrative embodiments, in which the principles of the disclosure are utilized, and the accompanying drawings of which:

FIG. 1 is a diagram showing an example of a digital guidance platform configuration for providing digital guidance in an underlying computer application.

FIG. 2 is a diagram showing exemplary configurations of how the digital guidance platform of FIG. 1 interfaces with an underlying computer application.

FIG. 6 is an exemplary screen shot showing a page element in the underlying software application (Salesforce® in this example), and a popup window generated by the digital guidance content.

FIG. 7 is a snippet of example HTML code in condensed format.

FIG. 8 is a table showing properties of example attributes found in the code of FIG. 7.

FIGS. 9-14 show various aspects of a rule configuration window provided by an exemplary element finder rule engine.

DETAILED DESCRIPTION

Figure 3A:
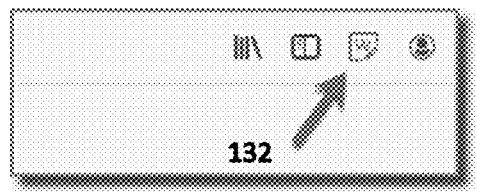
FIGS. 3A-3I are a series of partial screenshots showing exemplary functionality of a content authoring module/editor.

Described herein are apparatuses (e.g., systems, computing device readable media, devices, etc.) and methods for an improved digital guidance platform. The innovative platform changes the way application support and learning content is consumed. In some embodiments, this is accomplished by providing contextual and interactive walkthroughs inside software applications at the time a task is being performed (i.e. providing real-time guidance to users.) Examples of software applications that the platform may be used with include Salesforce®, Oracle CRM®, Microsoft Dynamics®, Success Factors®, SharePoint® and other applications. In some embodiments, the innovative platform may take the form of a simple web browser extension. Developers of a software application may use the extension to provide guided navigation to users of the software application so that the users can quickly learn how to use the application. The users' training and or support experience can be enhanced with walkthroughs, smart pop-ups and tool-tips provided by the platform. These platform tools may be configured to show up based on a particular user's role and current location in the software application. The innovative platform may be used with enterprise application software (such as the software applications mentioned above), custom application software (such as created by an IT department for a company's internal use), and end user software. Depending on the application, the innovative platform may the only training and support program for the application, or it may be used in conjunction with a training and support program native to the application.

In some embodiments, the innovative platform supports an end user through their entire life cycle with a software application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Referring to FIG. 1, an exemplary digital guidance platform 100 is depicted. It may include a content authoring module 110 (also referred to as an editor) and a content playback module 112, as shown. In this exemplary embodiment, the content authoring module 110 allows a content author to create digital guidance for end users of an underlying software application. Once this content is created and saved, it may be accessed or "played back" using the content playback module 112. In some implementations, the content authoring module 110 and the content playback module 112 are combined and provided to a content author in a single software package. In use, the software package may reside on a content author's computer, and or may reside on a server in "the cloud" and be offered as Software as a Service (SaaS.) In other implementations, content authoring module 110 and a content playback module 112 may be separately deployed. For example, one of the modules may take the form of a simple web browser extension as previously mentioned, and the other module may be downloaded to a content author's computer.

Referring to FIG. 2, exemplary content playback configurations are depicted. In some implementations, content playback module 112 is a standalone system that is accessed by an end user from within an underlying software application 120. For example, an underlying software application 120, such as Salesforce®, may be provided with links to access content playback module 112, which is located on a server in the cloud. In some implementations, content playback module 112' may be integrated within the underlying software application 112'. In either of these exemplary configurations, the end user is able to access the digital guidance content from content playback module 112 or 112' while using a feature of underlying software application 120 with which the content is associated. In some implementations, both an integrated content playback module 112' and an external module 112 are available to the end user.

Referring to FIGS. 3A-3I, exemplary functionality of content authoring module/editor 110 will be described in relation to the exemplary partial screenshots in the figures. In this exemplary embodiment, the patent applicant's company name "whatfix" is used as the name of digital guidance platform 100. The exemplary functionality includes the ability to create a "walkthrough", which will walk an end user of underlying software application 120 through each sequential step of a particular task in application 120 when the walkthrough is played back. In some implementations, the walkthrough can proceed either one step at a time, waiting at the end of each step for the end user to advance the walkthrough to the next step. Alternatively, the walkthrough can proceed automatically, running through all of the steps without stopping (unless paused by the user.) Additionally, the walkthrough can provide the end result of the task that the walkthrough is teaching. For example, a walkthrough can show an end user each step needed to determine the number of open sales leads that have not been contacted, and at the end of the walkthrough the actual number is provided to the end user to. Referring first to FIG. 3A, the creation of a walkthrough begins by the author logging in to the underlying application where the author wants to create content, and then launching the previously described content authoring module/editor 110 by clicking icon 132.

Figure 3B:
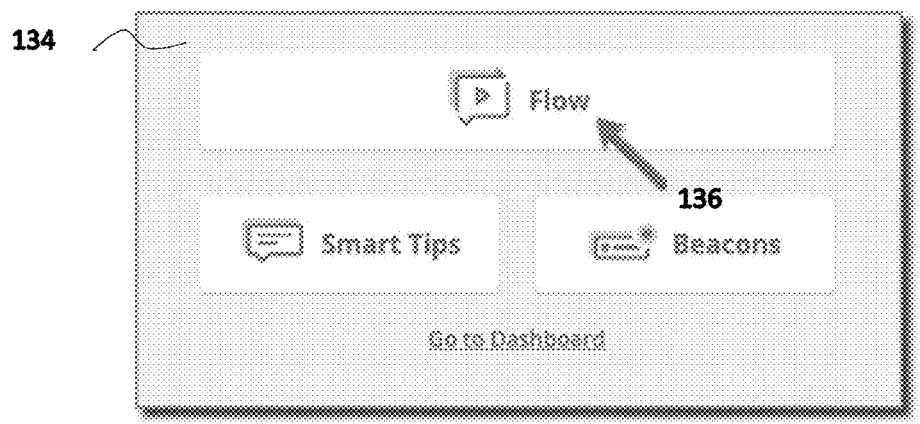

Once the editor launches, it displays window 134 as shown in FIG. 3B. Window 134 includes three buttons labeled Flow, Smart Tips and Beacons. The Flow button is for creating walkthroughs, the Smart Tips button is for creating content associated with data field validation, and the Beacons button is for creating content associated with software application change management. In this example the author clicks the Flow button 136.

Figure 3C:
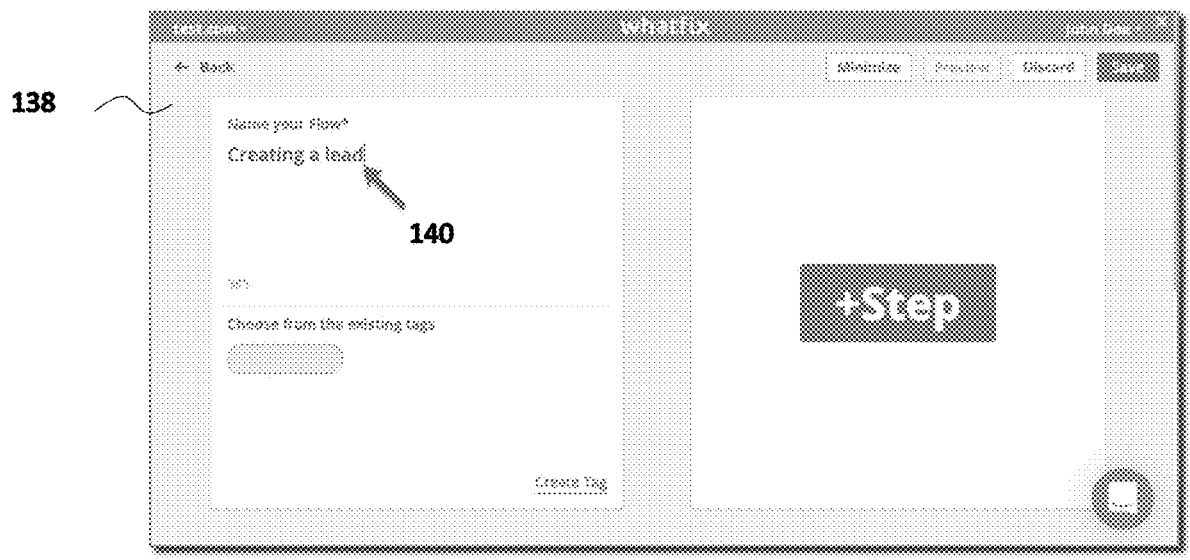

Clicking Flow button 136 opens window 138, as shown in FIG. 3C. Here the author can name the Flow or walkthrough as they want it to be displayed to an end user. In this example, the Flow is named "Creating a lead", as shown by arrow 140.

Figure 3D:
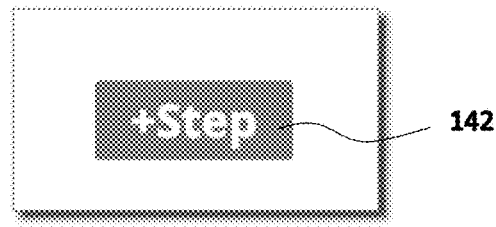
Figure 3E:
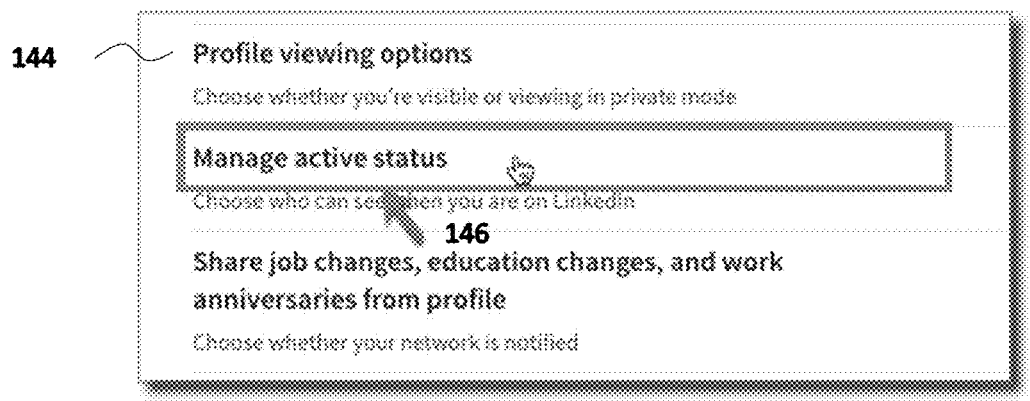

The author then clicks the +Step button 142, as shown in FIG. 3D. In some embodiments, the pointer icon changes (such as from an arrow to a hand), as shown in screen 144 of FIG. 3E, to indicate that the editor is waiting for the author to select a step of the sequence that the end user is to be guided through. The author then clicks the desired element on the page of the underlying software application that the end user will need to select. In this example, the end user will be guided to select the Manage Active Status button 146 on screen 144 during playback of the walkthrough, so the Flow author clicks button 146 at this time.

Figure 3F:

After the Flow author clicks the desired element 146, the editor module displays screen 148 as shown in FIG. 3F with automatically generated action text 150 describing the particular step. The Flow author may then review, edit and or add text or other information associated with the step. The author may also select other parameters regarding how this step of the walkthrough will be played back, such as the position of the Tooltip on the screen, or accept some or all of the default settings. Once the parameters of this step are in order, the author then clicks the Add Step button 152.

Figure 3G:
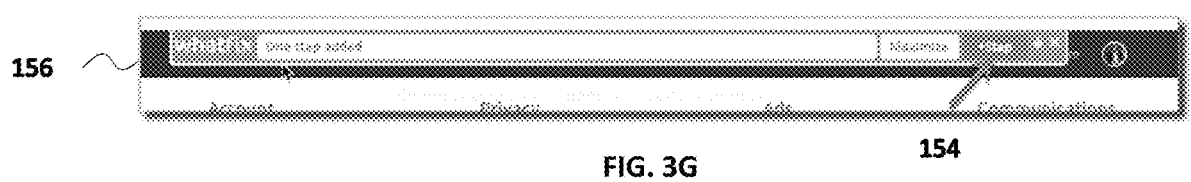
Figure 3H:
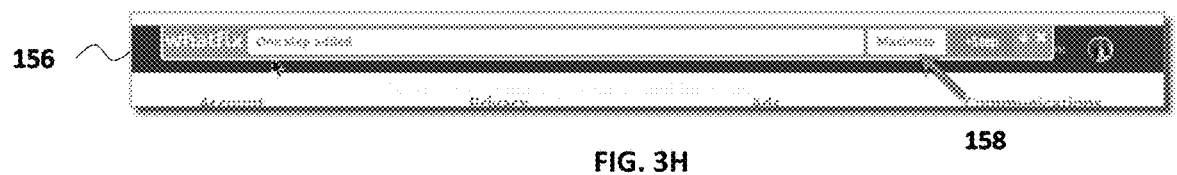
Figure 3I:
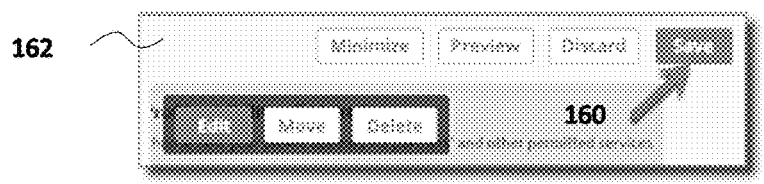

To capture the next step in the sequence, the Flow author then navigates to where in the underlying software application the author wants to start the next step. The author then clicks the +Step button 154 in the editor toolbar 156, as shown in FIG. 3G. The pointer icon again changes to indicate that the editor is waiting for the author to select another step of the sequence, as previously described in reference to FIG. 3E. The author then repeats the intervening actions described above for each step that is to be added to the Flow sequence. When all the steps have been captured, the author clicks the Maximize button 158 on the editor toolbar 156, as shown in FIG. 3H, and then clicks the Save button 160 after window 162 opens, as shown in FIG. 3I.

Before various walkthroughs are made available to end users of the underlying software application, segmentation or mapping may be used to associate each walkthrough with a particular page or part of the underlying software. Segmentation helps content authors display only walkthroughs that are relevant to end users when they are on a particular page. Segmentation, as the name implies, provides a way of targeting walkthroughs to specific users on "widgets" like Self-help and Task List on previously described content playback module 112. Segments can be defined through various conditions and rules. In some embodiments, a segment can be built to filter walkthroughs as per user login, the contents of a Uniform Resource Locator (URL), elements on the screen, and/or a mix of other criteria. For example, segments may be used to display walkthroughs based on a particular group of users' logins, a current tab an end user is on, visual elements on pages of the underlying software and/or other variable defined by the walkthrough author.

Figure 4A:
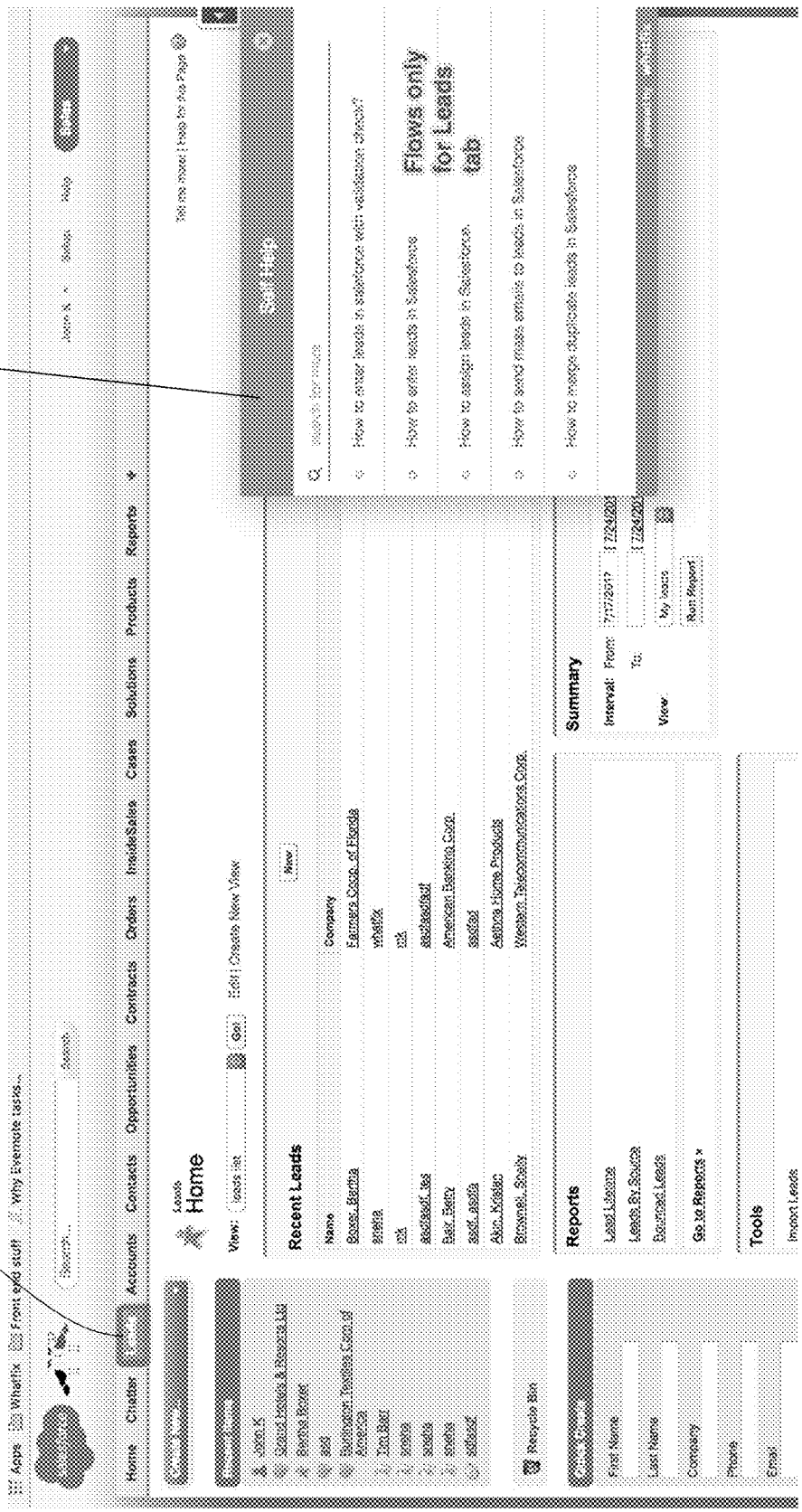
FIGS. 4A and 4B are screenshots showing examples of different lists of walkthroughs that are displayed by a content playback module depending on the location of an end user in an underlying software application.
Figure 4B:
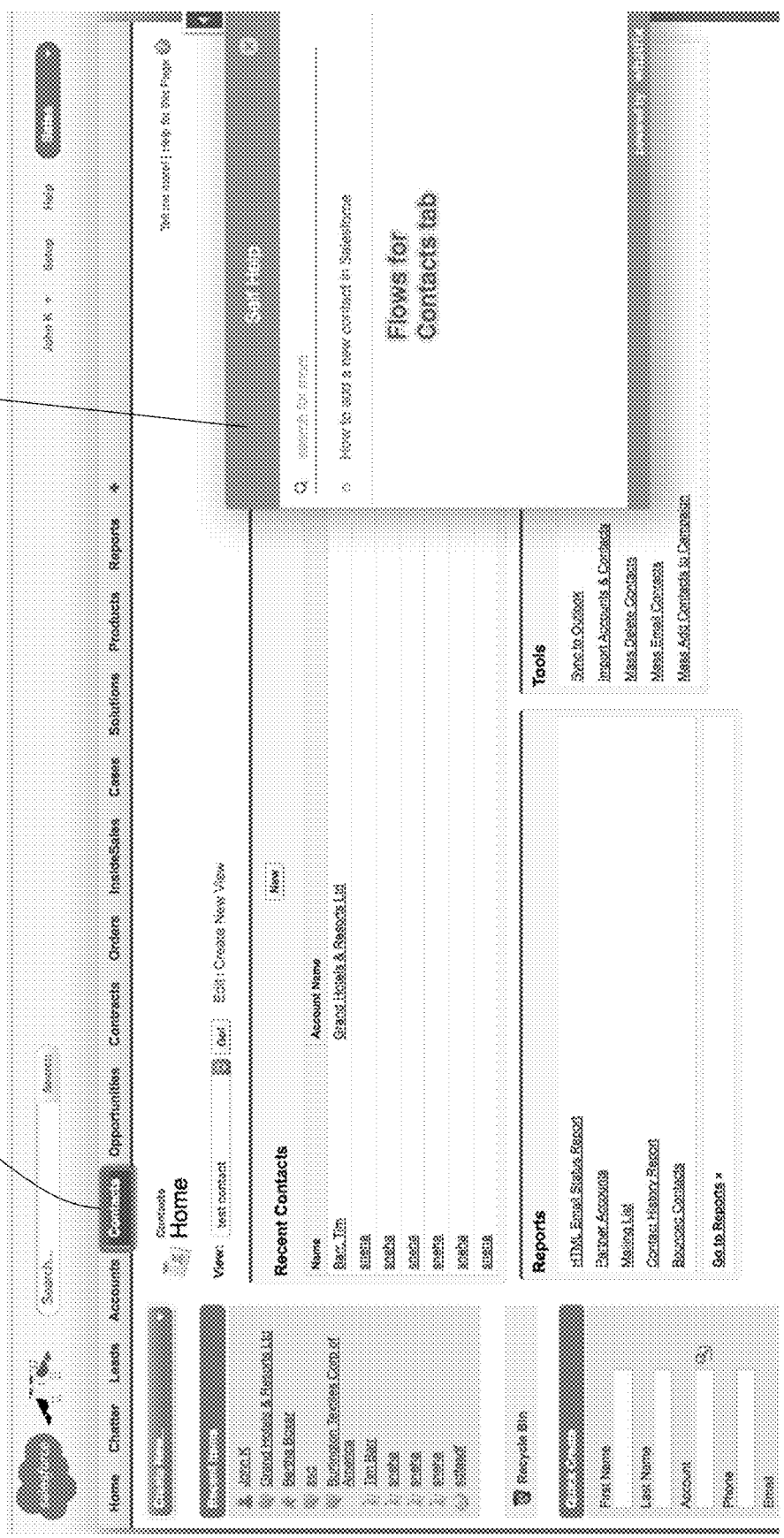

In one embodiment, a page of the underlying software application may have two different tabs, for example: Leads and Contacts. Using segments, different walkthroughs can be displayed depending on which tab the end user navigates to. Rather than seeing a long list of help content, the end user only sees contextual content that is relevant to the particular page and tab currently being used. FIG. 4A shows an example of a list of walkthroughs 170 that is displayed by content playback module 112 when the end user has navigated to the Leads tab 172 of an underlying Salesforce application and clicked on Self Help. FIG. 4B shows an example of a different list of walkthroughs 174 that is displayed by module 112 when the end user has navigated to the Contacts tab 176.

Segments can be created through a simple selection of walkthroughs and visibility rules provided in the editor module 110. To segment walkthroughs, an author can manually select all the necessary flows/walkthroughs to display on a particular page of the application. Segmentation can be set up based on tags as well. Tags can be as simple as a user group or the page/module name. Segmentation of flows can be set up through single or multiple tags. In some embodiments, the editor module 110 can perform segmentation on the basis of visual elements found in the application. The editor can segment flows based on visual elements present or absent on various pages of the underlying application.

Referring to FIGS. 5A-5I, specific examples of types of segmentation criteria that may be used are provided.

Figure 5A:
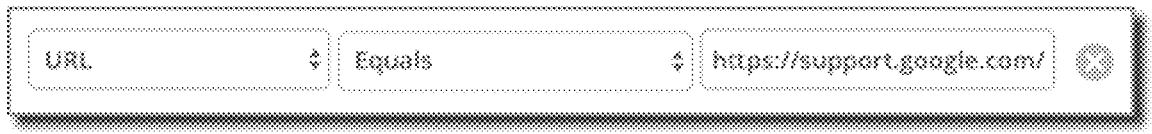
FIGS. 5A-5I are a series of partial screenshots showing examples of types of segmentation criteria.

Referring to FIG. 5A, a Uniform Resource Locator (URL) may be used to segment flows. In some embodiments, any part of the URL may be specified as a visibility rule. For example, the URL Hostname, path, parameter, etc. may be specified using this criterion.

Figure 5B:
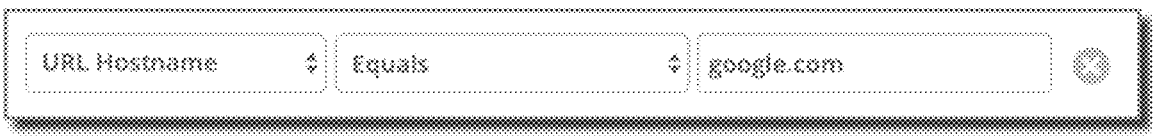

Referring to FIG. 5B, a URL Hostname may be used to segment flows. In some implementations, a content author may want to uniquely identify a page using the domain name and can use this condition. The URL Hostname is the first part of any URL. For example, if the author wished to display the tip only if the end user is on google.com, she can add a condition as shown in the screenshot of FIG. 5B.

Figure 5C:
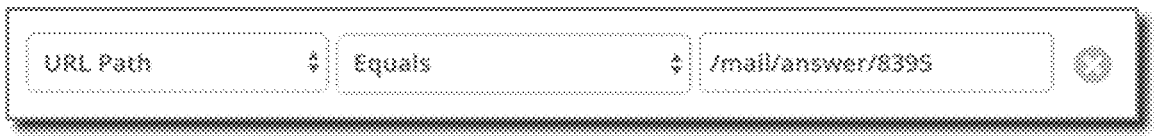

Referring to FIG. 5C, a URL Path may be used to segment flows. The website path name is what is listed between a domain name and the parameters or hashes. For example, if the website URL is //support.google.com/mail/answer/8395?hl=en&ref_topic=3394219, then the pathname is /mail/answer/8395. This condition may be specified as shown in FIG. 5C.

Figure 5D:
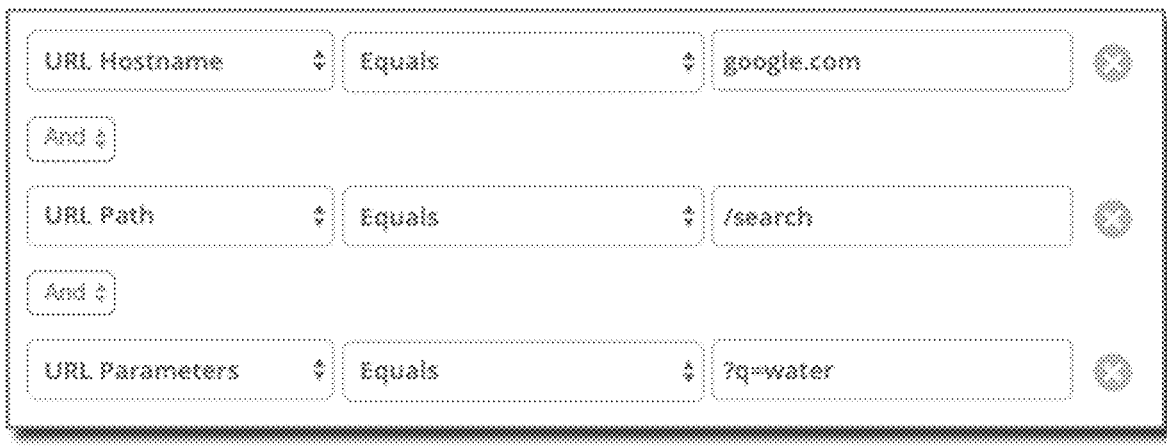

Referring to FIG. 5D, a URL Parameter may be used to segment flows. If an author wishes to identify a web page using the parameters on the URL, this condition may be used. For example, if a tip is to be shown to a user only when the search phrase has "water" in Google, this can be set up as shown in FIG. 5D. In this example, three conditions need to be met: 1) the page must be google.com (URL Hostname); 2) the pathname is /search (URL Path); and 3) the query parameter is ?q=water.

Figure 5E:
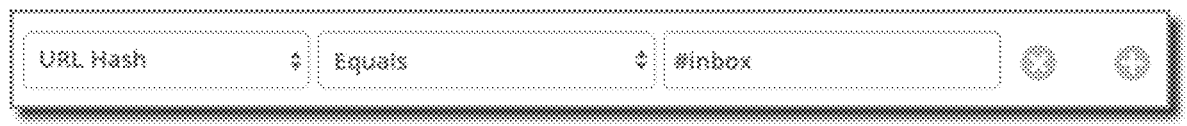

Referring to FIG. 5E, a URL Hash may be used to segment flows. In particular, a page may be identified using the hash value of the URL using this condition. Hashes are usually present in Single page applications made using AngularJs or ReactJs. Typically there are no page refreshes but only Hash changes.

Figure 5F:
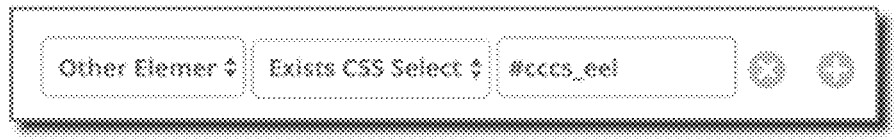

Referring to FIG. 5F, Other Elements may be used to segment flows. For example, if a content author wants to identify a page based on the presence of a particular element (other than the one selected by the author for the flow) on the web page, this condition can be used. In some embodiments, the values passed to this condition are Cascading Style Sheets (CSS) selectors, such as #ID, .class or Jquery. Cascading Style Sheets is a stylesheet language used to describe the presentation of a document written in HTML or XML. CSS describes how elements should be rendered on screen or on other media. Note that in some implementations, use of this condition to segment flows can slow down the underlying application. Further information on the use of CSS selectors may be found on the internet, such as at https://developer.mozilla.org/en-US/docs/Web/CSS/CSS-_Selectors.

Figure 5G:

Referring to FIG. 5G, a Window Variable may be used to segment flows. In some implementations, a value of a particular JavaScript global variable is used to identify conditions for showing tooltips. For example, an option to check "usersole='admin'" may be provided to set this condition. This option may also be to perform comparisons, such as using the following criteria: Greater than; Less than; Date Greater than; or Date Less than.

Figure 5H:
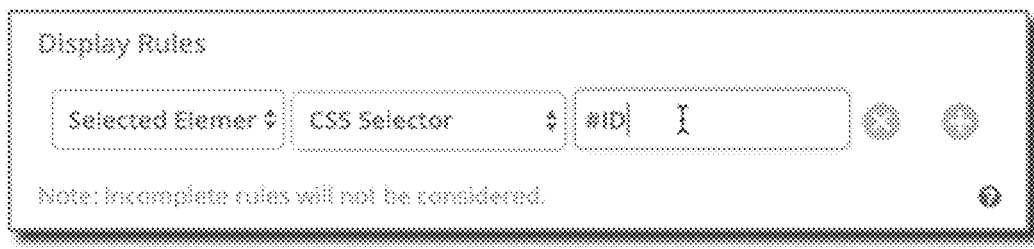

Referring to FIG. 5H, an Element CSS Selector/JQuery may be used to segment flows. In some implementations, the application uses unique IDs for some elements on the page. This option may be used when the element is selected from a list of options. For example, a drop-down menu. This lets an author provide their own CSS selector identifier for the element. Sample values include: #ID_ELEMENT; CLASS-NAME; input[title="Search"]; and $("#ID").

Figure 5I:
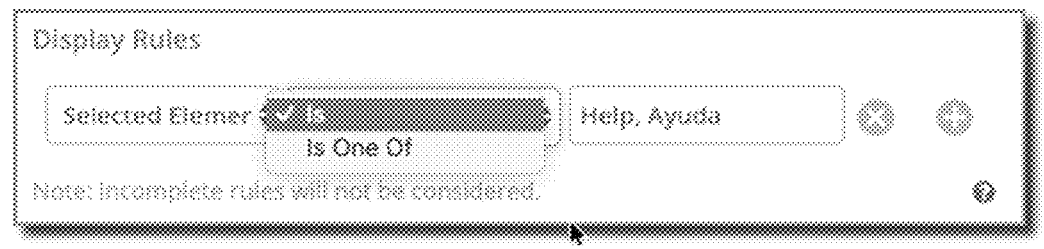

Referring to FIG. 5I, an Element Text may be used to segment flows. In some implementations, this is the text that is displayed on the Element selector that is described above in reference to FIG. 5H. If an application supports multiple languages, the option "is one of" may be chosen and the name added with a comma (,) as a delimiter.

The exemplary segmentation criteria described above with reference to FIGS. 5A-5I may be used to manually segment various flows/walkthroughs and other content. In this manner, each piece of content is associated with a unique page or location in the underlying application so that the content is only displayed when the user is on the particular page or pages associated with the content.

Referring to FIG. 6, editor module 110 may also be configured to associate each piece of content with one or more elements in the underlying application, according to aspects of the disclosure. FIG. 6 shows an exemplary screen shot where the underlying software application is Salesforce®. The application screen includes button 180 entitled "New." This button, also referred to herein as an element, is used to create a new sales lead in Salesforce®. A pop-up window 182, pointing to element 180, is also shown in FIG. 6. Pop-up window 182 is generated by an exemplary walkthrough and guides the end user to click on element 180. A walkthrough may be associated with many different elements, such as buttons, inputs, text, radio buttons, checkboxes, dropdowns, links, and code elements such as span, div, header, anchor and list.

Over time, elements associated with a walkthrough or other content may change. For example, as the underlying software application is updated to a new version, the name shown on element 180 may change to another name, its location may change to another position on the same page or on a different page, styling or other attributes that refer to element 180 in the software coding may change, or other changes may occur to the element. When these changes occur, the walkthrough may stop functioning properly unless it is able to adapt to the changes in the element. It is preferable that editor module 110 be able to respond to (or be tolerant of) these changes automatically rather than requiring that the walkthrough be recreated or modified. It is also preferable that this automatic adaptation occur as seamlessly and reliably as possible. In some embodiments, the content playback module 112 and or another portion of digital guidance platform 100 plays a role in adapting the walkthrough to the changes in element 180. As explained below, editor module 110 (in this example) can automatically, without being configured by a content author, detect the element in the walkthrough based on attributes of the element, and adapt the walkthrough to continue functioning despite the changes that have occurred to the element. In some embodiments, the editor module 110 is configured to allow the content author to define rules that allow module 110 to better detect elements even after they have changed and enable the walkthrough to continue functioning as it did before the elements were changed. In some embodiments, this is done in a way that allows a content editor who does not have coding experience, or much knowledge of how the underlying application works, to easily define rules that enable robust element detection.

Figures 8, 9:
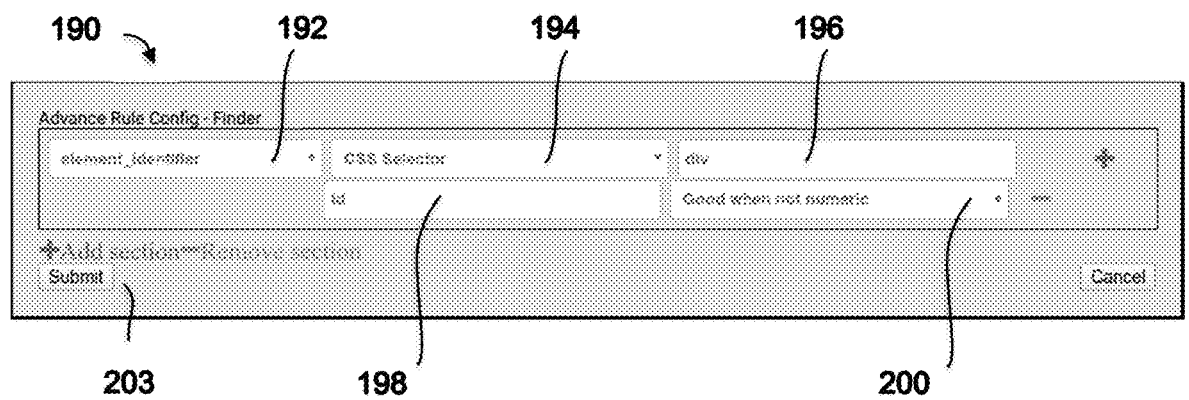

Referring to FIGS. 7 and 8, a snippet of example HTML code (condensed) and a table showing properties of example attributes found in the code, respectively, are provided. The code of FIG. 7 may be used to describe series of page elements, such as element 180 shown in FIG. 6. Each line of the code in FIG. 7 represents a division or block of content in the underlying software application, and each division contains multiple attributes. For example, the division in the first line of code includes a first attribute of id="p-logo" and a second attribute of role="banner". Each attribute is formed by a key-value pair, where the key is listed first, followed by an equals sign, which is followed by the value in quotation marks. For example, if the attribute has a key of "id", its value may be "p-navigation" as shown in the second line FIG. 7 and in the bottom line of FIG. 8, or its value may be "p-logo" as shown in the first line FIG. 7. Alternatively, if the attribute has a key of "class", its value may be "portal" as shown in the second line FIG. 7 and in the first line of FIG. 8. Each page element can have any number of attributes associated with it.

According to aspects of the disclosure, editor module 110 is configured to assign strong attributes to each page element, such that when weaker attributes of the page elements are changed, each page element can still be located using the strong attributes that have been assigned.

Which attributes of an element that should be considered strong will vary from underlying application to application, from technology to technology, and from development team to development team. In some embodiments, editor module 110 is configured to be deployed "out of the box" with the ability to assign strong attributes to page elements. This may be accomplished by configuring editor module 110 to assign strong attributes to page elements based on what the underlying software application is. For example, if Salesforce® is the underlying application, editor module 110 may be configured with default settings to focus on Ids, data-aura-class and some underlying attributes in certain situations when finding particular page elements. On the other hand, if the underlying application is the Icertis™ contract management platform, editor module 110 may be configured with default settings to focus on the first alphabetic part of Ids attributes instead.

The above approach may be used for a large number of major software applications, such Salesforce®, Oracle CRM®, Microsoft Dynamics®, Success Factors®, SharePoint® and other applications. However, this approach may not be feasible for applications that are smaller, less known, proprietary and or are rapidly changing. For these situations, editor module 110 may be provided with an element finder rule engine. The rule engine can include a set of rules for assigning strong attributes that can be configured by the content author.

Referring to FIG. 9, a rule configuration window 190 of an exemplary element finder rule engine is shown. In some embodiments, a content author uses one or more rule configuration windows to configure the rules of the engine prior to creating content for a particular underlying application. Once the rules have been created, editor module 110 can then automatically select strong attributes for each page element associated with the content as the content is being created. The editor module 110 can then save the strong attributes along with the content so that when the content is being played back by playback module 112, the strong attributes can be used to locate the associated page elements.

Figure 10:
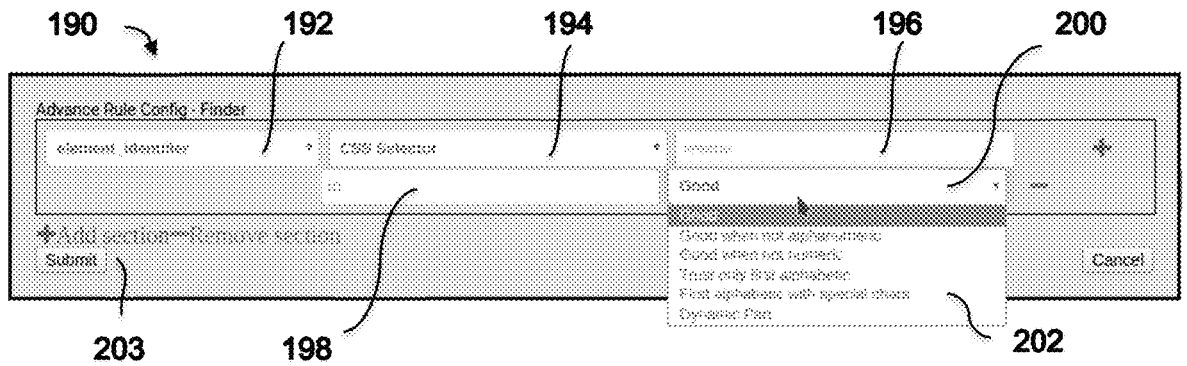

In this exemplary embodiment, rule configuration window 190 includes five fields 192, 194, 196, 198 and 200 that are used in combination to set the element finder rules of the rules engine. Some or all of the fields may be provided with a dropdown menu, as denoted with the triangles on the right end of fields 192, 194 and 200 of this example. For example, selecting/clicking on the triangle in field 200 brings up a drop down menu 202 as shown in FIG. 10.

In this exemplary embodiment, field 192 is selected to indicate what the remaining fields are referring to. For example, field 192 may be populated with "element_identifier", as shown in FIG. 9, to indicate that the remaining fields are defining the element identifier. As another example, field 192 may be populated with "element_hierarchy" to indicate that the remaining fields are defining where in the program code hierarchy the element is found, as will subsequently be explained in more detail with reference to FIG. 14. Field 194 is sub qualifier of field 192, such as CSS (Cascading Style Sheet) Selector.

In this exemplary embodiment, field 196 is used to indicate a value of the selector for which the content author wants to trust the attribute (or indicate that the attribute is not trustable.) For example, trust the id for div elements only. Field 198 indicates what attribute of field 196 will be used, for example 'id'. Field 200 is used to indicate when to trust the configuration of the current rule, such as always (when Good is selected), only when the values are alphanumeric, only when the values are not alphanumeric, etc. Additional options for field 200 in this exemplary embodiment are shown in the drop down menu 202 in FIG. 10. This is not an exhaustive list and further options may be provided. When the content author is done configuring the fields in window 190, Submit button 203 is pressed to create the rule and close the window. The next time content is authored, this rule will be applied as previously described.

Figure 11:
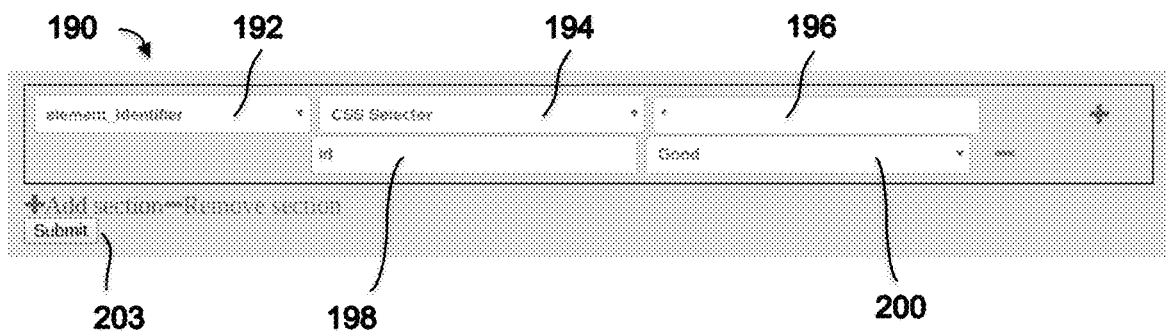

Referring to FIG. 11, another example case is provided. With the rule configuration shown in this case, Ids are trustable in hierarchy or at the element level.

Figure 12:
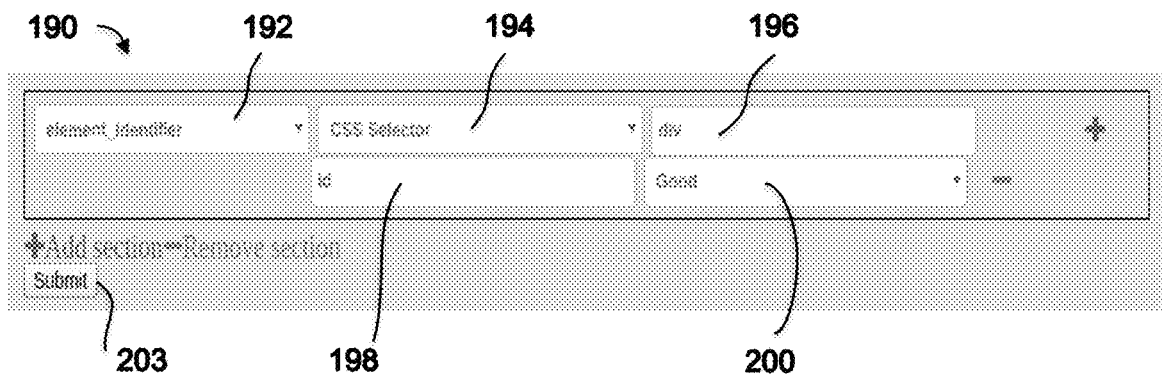

Referring to FIG. 12, another example case is provided. With the rule configuration shown in this case, Ids are trustable for only document divisions (divs.)

Figures 13, 14:
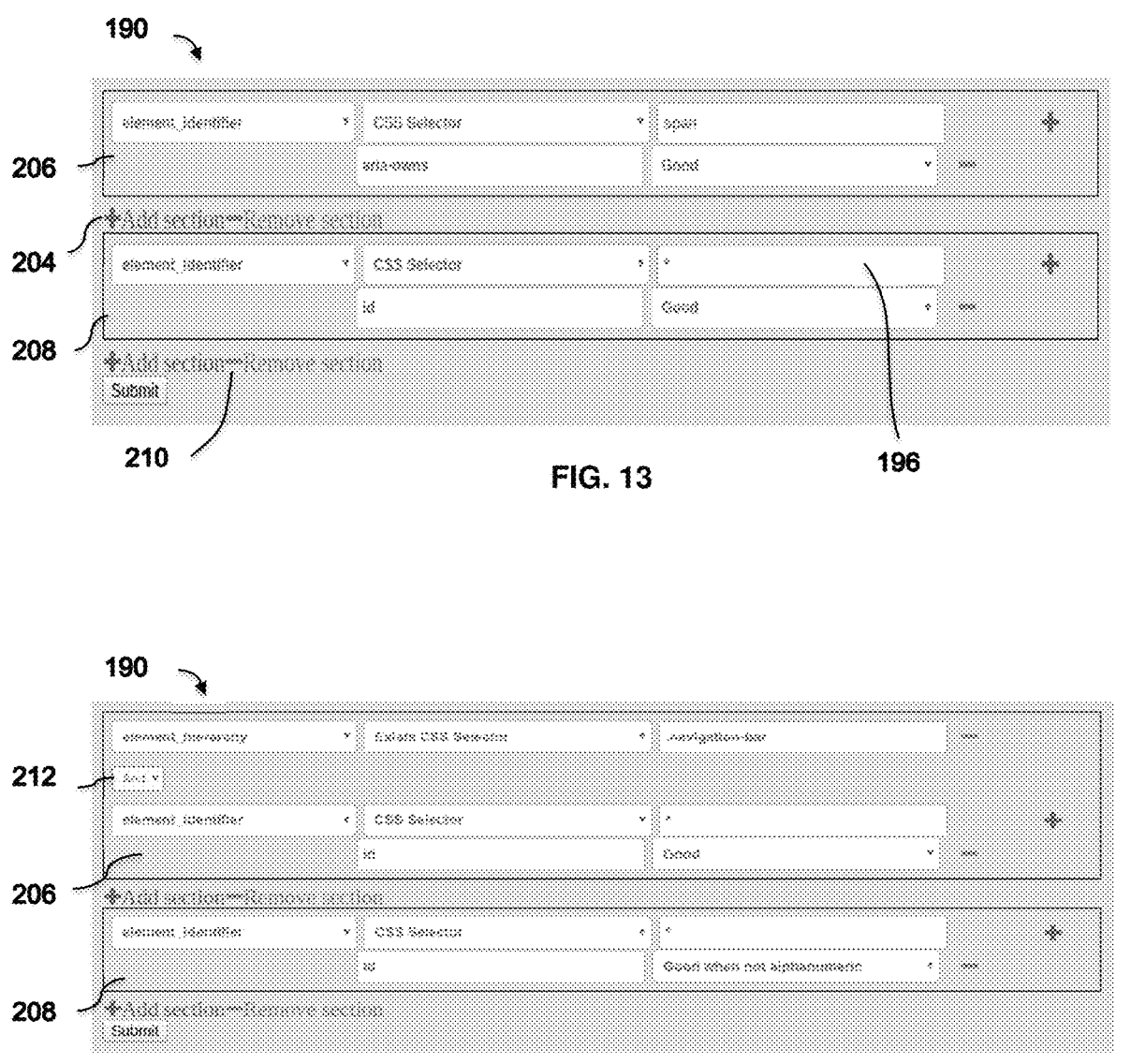

Referring to FIG. 13, another example case is provided. With the rule configuration shown in this case, Ids are trustable for span elements only. This case also illustrates how an Add Section button 204 located in the first rule section 206 can be used to add a second rule section 208 immediately below the button, as shown. Similarly, a Remove Section button 210 can be provided to remove the rule section in which it is located. With this arrangement, multiple rules can be configured in two or more sections such that they work in concert. In some embodiments, each rule carries the same weight. In other embodiments, the rule in the first section is processed first and carries the most weight, then the rule in the second section is processed, and subsequent rule sections, if any, are processed in order. Note that a wildcard character may be used in some fields, such as field 196 in the second rule section 208 of this example.

Referring to FIG. 14, another example case is provided. With the rule configuration shown in this case, Ids are trustable for elements inside the navigation bar. For elements that are outside the scope of navigation bar, Ids are trustable only when they are not alphanumeric. As with the previous case illustrated in FIG. 13, this case shows a rule configuration window where a second section has been added. This case also shows how plus and minus buttons may also be provided in each section, such as those shown on the right in each section. These buttons may be used to add or subtract fields to or from a line when appropriate. When fields are added with the plus button, a Boolean operator 212 may also be added as shown. Boolean operator 212 may allow the content author to select from a variety of operators, such as AND, OR or NOT.

Figure 15:
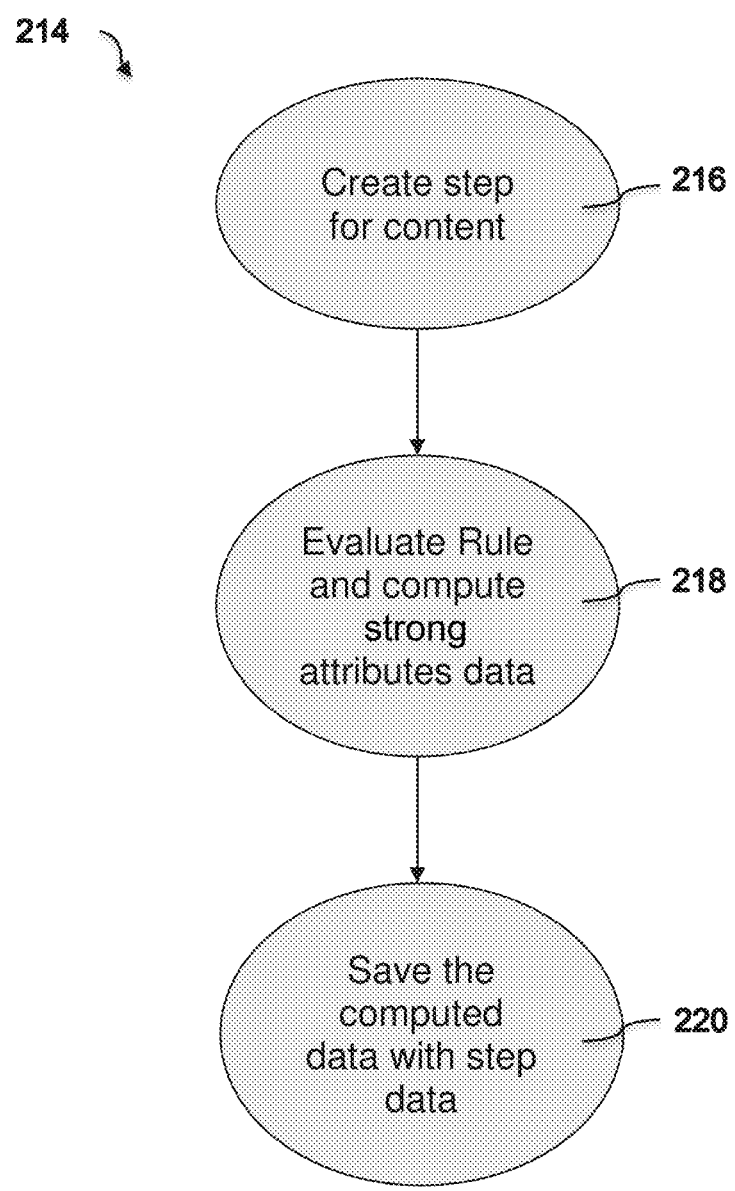
FIG. 15 is a flowchart depicting an exemplary process used by a content authoring/editing module of a digital guidance platform.

Referring to FIG. 15, an exemplary process 214 used by editor module 110 is depicted. Step 216 involves creating digital guidance content, such as creating a step in a walkthrough, as previously described. After the content step is created (or in some implementations, while the content step is being created), editor module 110 automatically applies the previously created rule or rules for assigning strong attributes to the page elements associated with the content step, as shown in step 218 in FIG. 15. When the content step is completed, editor module 110 saves the content step along with the strong attributes of the page elements associated with that content step, as shown in step 220. This process is repeated for each step in the walkthrough/content being created. In some implementations, the strong attributes for all of the content steps are computed at once and saved along with all of the content steps after an entire walkthrough or multiple walkthroughs has/have been created.

Figure 16:
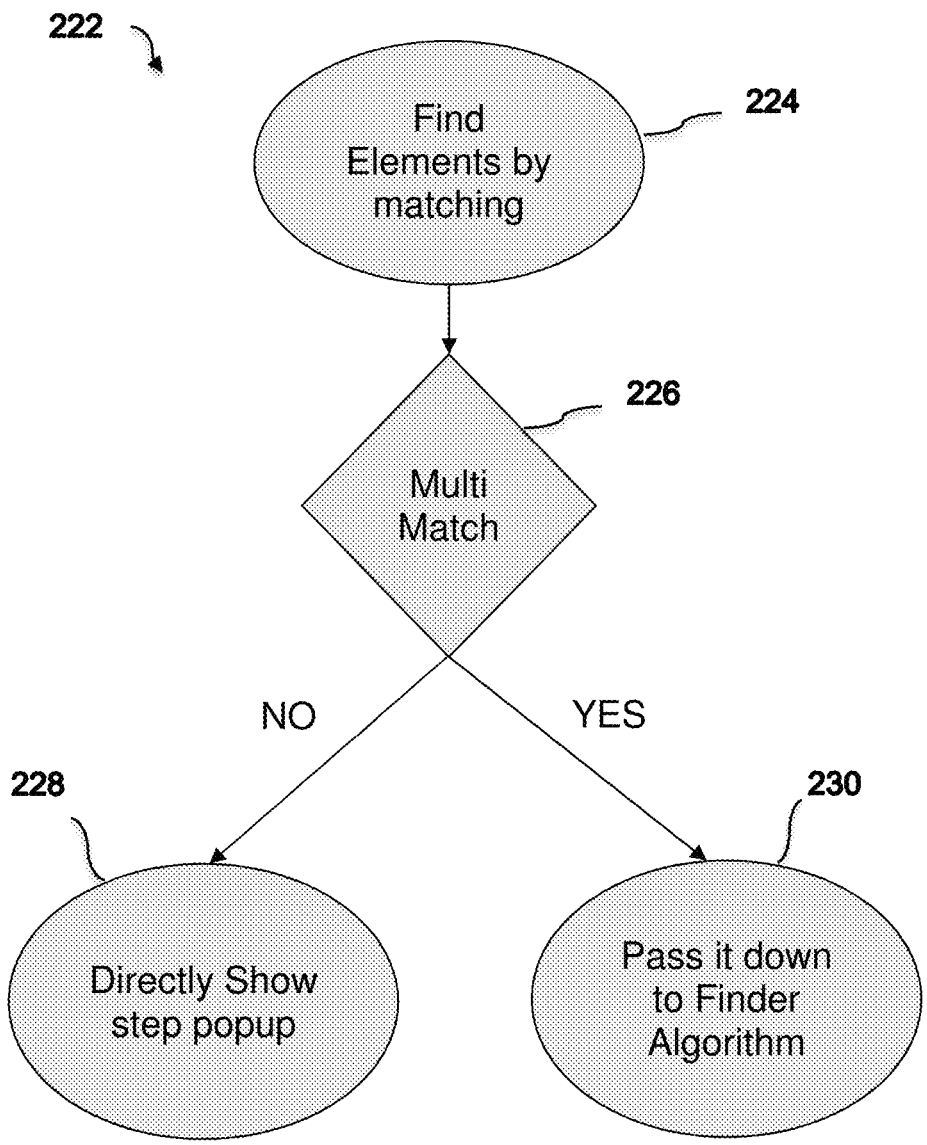
FIG. 16 is a flowchart depicting an exemplary process used by a playback module of a digital guidance platform.

Referring to FIG. 16, an exemplary process 222 used by playback module 112 is depicted. This process occurs when an end user is playing back the digital guidance content in the underlying software application, as previously described. At the time of content playing, playback module 112 will try to match the strong attribute data that was captured in process 214 of FIG. 15 with elements in the software code in order to identify the appropriate page elements that go along with the walkthrough steps, even if those elements have been changed since the walkthrough was created. Step 224 involves scanning the code for the strong attributes and finding elements that match. If playback module 112 finds only one element that matches the saved strong attribute(s) at decision point 226 it directly proceeds, such as by showing a popup window associated with the walkthrough step adjacent to the page element, as depicted by step 228 in FIG. 16. If however, playback module 112 finds multiple elements that match the saved strong attribute(s) at decision point 226, it passes the analysis down to a Finder Algorithm in step 230. In some embodiments, the Finder Algorithm will take all possible elements and try to figure out the best possible element by matching different attributes.

Without the approach described above, playback module 112 might try to find each element by matching all of its attributes with equal weight. With the advantageous methods described herein, element finder rules can be configured to give priority to strong attributes of each element, thereby greatly increasing the chances of identifying the correct element in each case.

As described above for flows/walkthroughs, the same or similar functionality may be provided for Smart tips, Beacons and/or other content. In this way, automatic element detection may be used for various types of digital guidance content.

Various alternatives, modifications, and equivalents may be used in lieu of the above components. Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices.

Each program may be implemented in a high-level procedural or object-oriented programming language to operate in conjunction with a computer system. However, the programs may be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control or perform any of the steps, including but not limited to: displaying, communicating with the user, analyzing, modifying parameters (including timing, frequency, intensity, etc.), determining, alerting, or the like.

While exemplary embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. When a feature is described as optional, that does not necessarily mean that other features not described as optional are required.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of providing digital guidance in an underlying computer application, the method comprising the steps of:

setting a rule or rules, in a computing device, in advance of digital guidance content creation, for detecting, upon later playback of the content, page elements of the underlying computer application that are associated with the content;

recording, in the computing device, content steps of the digital guidance content as the content steps are created by a content author;

automatically applying, in the computing device, the set rule or rules for the detecting of the page elements, and thereby assigning a subset of attributes to the page elements;

saving, in the computing device, the content steps along with the subset of attributes of the page elements associated with the content steps;

playing back the digital guidance content, wherein a location of one or more of the page elements changes between a time the recording is performed and a time the playing back is performed; and during the playing back, searching for the subset of attributes assigned to the page elements when the digital guidance content was created in order to properly detect the one or more of the page elements whose location has changed, as if the location had not been changed, wherein the rule or rules for detecting page elements associated with the content are initially preset as defaults within a content authoring module of a digital guidance platform and are subsequently modified by the content author in the setting a rule or rules step, such that the content author affects which of the subset of attributes are assigned to the page elements during the automatically applying the set rule or rules step.

2. The method of claim 1, wherein the rule setting, the recording, the automatic rule applying and the saving are performed by a content authoring module of a digital guidance platform.

3. The method of claim 1, wherein the playing back is performed by a content playback module of a digital guidance platform, and wherein the content playback module searches for the subset of attributes assigned to the page elements when the digital guidance content was created in order to properly detect the one or more of the page elements whose location has changed as if the location had not been changed.

4. The method of claim 3, wherein the content author is not required to make any changes to the digital guidance content after the location of the one or more of the page elements is changed.

5. The method of claim 3, wherein the content playback module finds multiple page elements when searching for the subset of attributes and then employs a finder algorithm that considers all possible page elements and finds a best match by considering different attributes.

6. A non-transitory computing device readable medium having instructions stored thereon for providing digital guidance in an underlying computer application, wherein the instructions are executable by a processor to cause a computing device to:

set a rule or rules, in a computing device, in advance of digital guidance content creation, for detecting, upon later playback of the content, page elements of the underlying computer application that are associated with the content;

record, in the computing device, content steps of the digital guidance content as the content steps are created by a content author;

automatically apply, in the computing device, the set rule or rules for the detecting of the page elements, and thereby assign a subset of attributes to the page elements;

save, in the computing device, the content steps along with the subset of attributes of the page elements associated with the content steps;

play back the digital guidance content, wherein a location of one or more of the page elements changes between a time the content is recorded and a time it is played back; and during content play back, search for the subset of attributes assigned to the page elements when the digital guidance content was recorded in order to properly detect the one or more of the page elements whose location has changed, as if the location had not been changed, wherein the rule or rules for detecting page elements associated with the content are initially preset as defaults within a content authoring module of a digital guidance platform and are subsequently modified by the content author in the setting a rule or rules step, such that the content author affects which of the subset of attributes are assigned to the page elements during the automatically applying the set rule or rules step.

7. The non-transitory computing device readable medium of claim 6, wherein the instructions are further configured to perform the rule setting, the recording, the automatic rule applying and the saving with a content authoring module of a digital guidance platform.

8. The non-transitory computing device readable medium of claim 6, wherein the instructions are further configured to have the playing back performed by a content playback module of a digital guidance platform, and wherein the content playback module searches for the subset of attributes assigned to the page elements when the digital guidance content was created in order to properly detect the one or more of the page elements whose location has changed as if the location had not been changed.

9. The non-transitory computing device readable medium of claim 8, wherein the instructions are further configured to locate the page elements during the play back of the digital guidance content regardless of whether the content author makes any changes to the digital guidance content after the location of the one or more of the page elements is changed.

10. The non-transitory computing device readable medium of claim 8, wherein the instructions are further configured to employ a finder algorithm that considers all possible page elements and finds a best match by considering different attributes whenever the content playback module finds multiple page elements when searching for the subset of attributes.

11. The method of claim 1, wherein the subset of attributes of the page elements comprises at least one key-value pair.

12. The method of claim 11, wherein a key of the at least one key-value pair can be a class, a role or an id.

13. The method of claim 1, wherein the subset of attributes of the page elements comprises a first key-value pair, a second key-value pair and a third key-value pair.

14. The method of claim 13, wherein a key of the first key-value pair is a class, a key of the second key-value pair is a role, and a key of the third key-value pair is an id.

* * * * *